Nov. 1, 1966　　　　　A. H. BURTON　　　3,282,150
MINIATURIZED MARKER MAKING SYSTEM
Filed Nov. 29, 1963
4 Sheets-Sheet 1
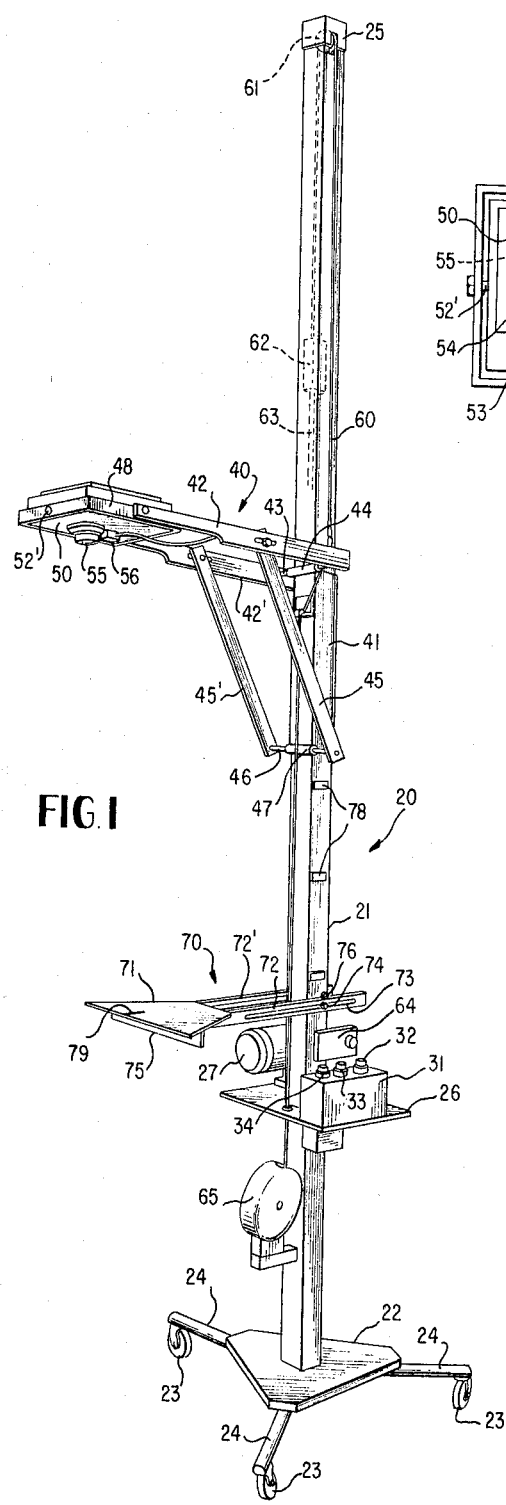
FIG. 1
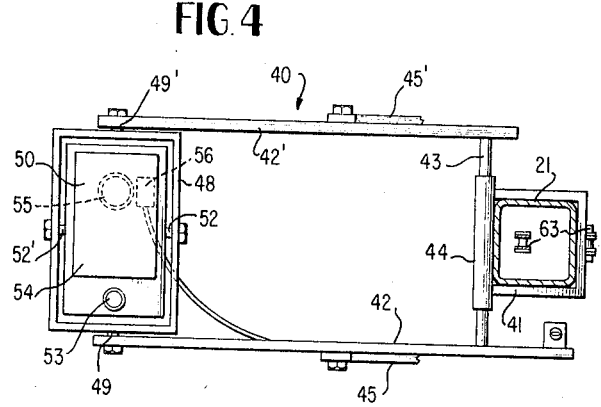
FIG. 4
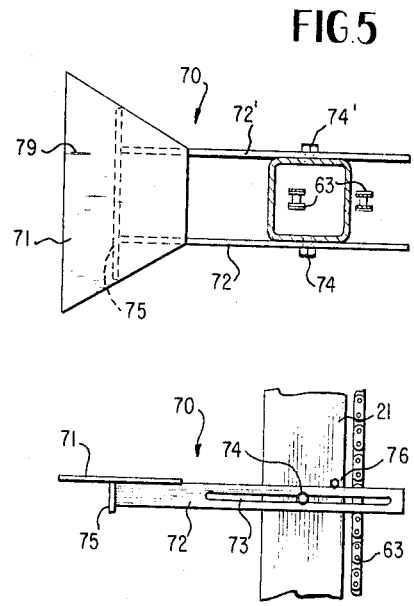
FIG. 5
FIG. 6
INVENTOR.
ARNOLD H. BURTON
BY Paul M. Craig, Jr.
ATTORNEY Nov. 1, 1966

A. H. BURTON 3,282,150

MINIATURIZED MARKER MAKING SYSTEM

Filed Nov. 29, 1963

INVENTOR.
ARNOLD H. BURTON

BY Paul M. Craig, Jr.
ATTORNEY

Nov. 1, 1966
A. H. BURTON
3,282,150
MINIATURIZED MARKER MAKING SYSTEM
Filed Nov. 29, 1963
4 Sheets-Sheet 3
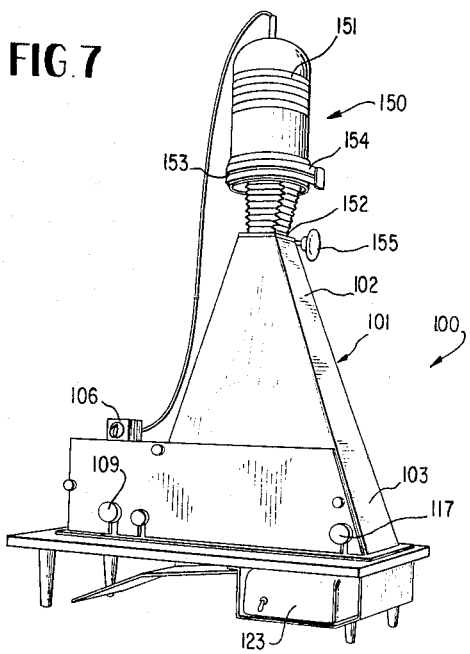
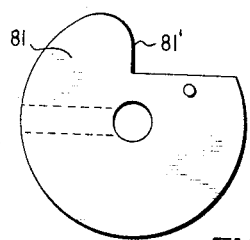
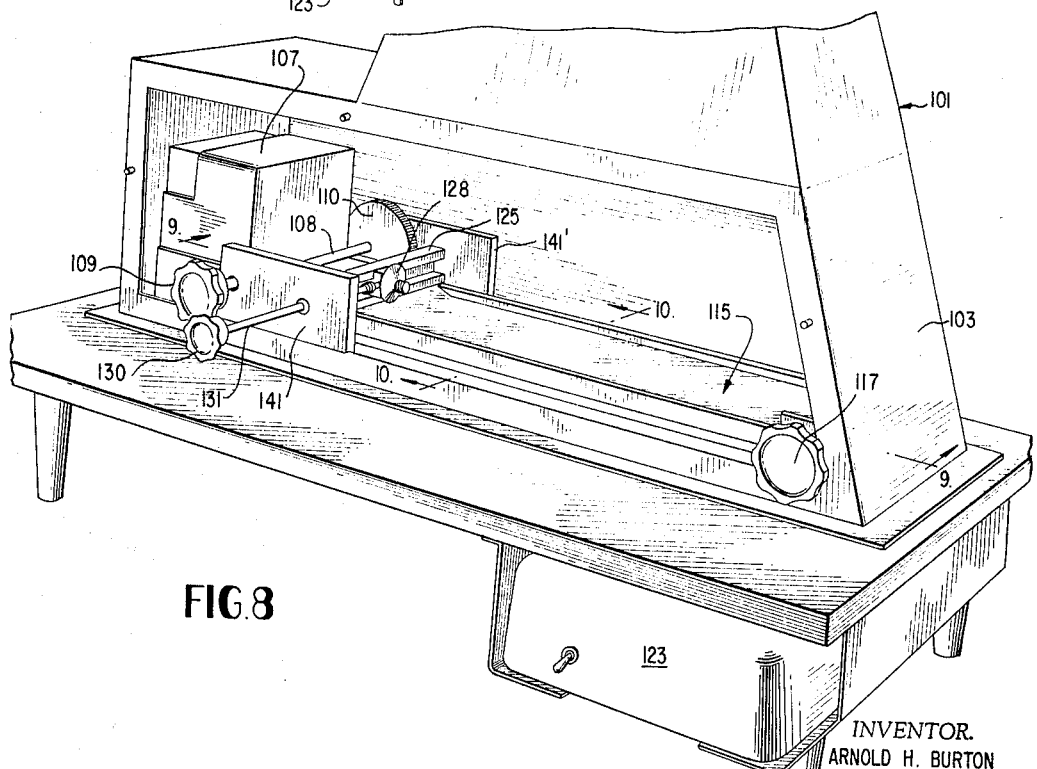
INVENTOR.
ARNOLD H. BURTON
BY
*Paul M. Craig, Jr.*
ATTORNEY Nov. 1, 1966
A. H. BURTON
3,282,150
MINIATURIZED MARKER MAKING SYSTEM
Filed Nov. 29, 1963
4 Sheets-Sheet 4
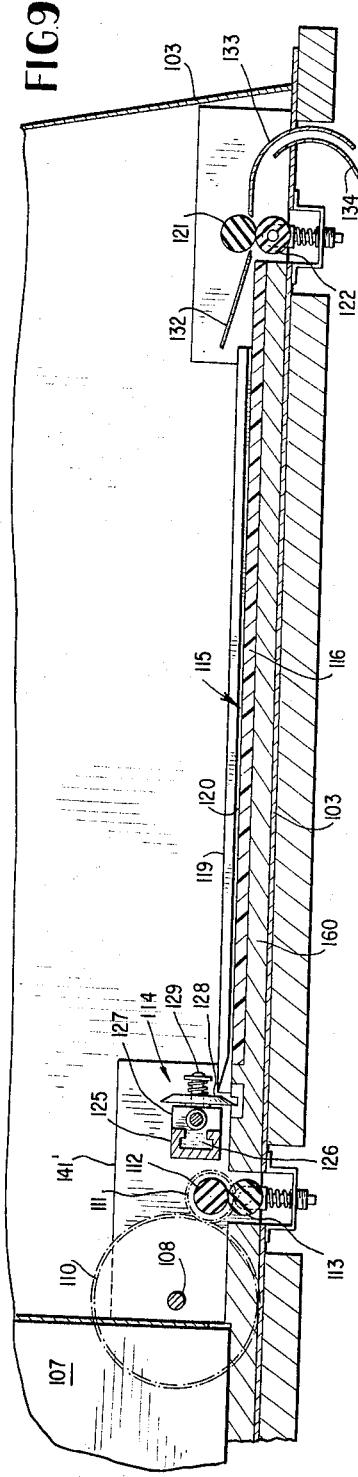
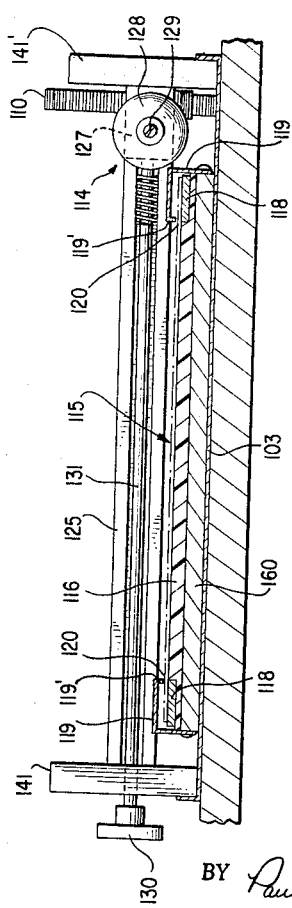
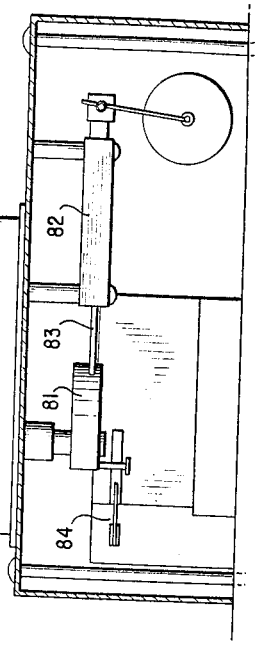
INVENTOR.
ARNOLD H. BURTON
BY Paul M. Craig, Jr.
ATTORNEY

United States Patent Office 3,282,150
Patented Nov. 1, 1966

3,282,150
MINIATURIZED MARKER MAKING SYSTEM
Arnold H. Burton, 13 Ruth Road, Plainview, N.Y.
Filed Nov. 29, 1963, Ser. No. 327,014
10 Claims. (Cl. 88—24)

The present invention relates to a miniaturized marker making system, and more particularly to a complete photographic system composed of a portable camera mount and a daylight enlarger, both of which form part of an integrated miniaturized marker making system.

Various miniaturized marker making systems have been commercially available, and at least one of these systems includes a special pantograph operable to reduce or miniaturize the patterns to 1/25 the original size. A cutting head adapted to cut through plastic material to reproduce the patterns in miniature as well as a special integrator operable to compute automatically the area of the patterns normally form part of this special pantograph equipment. The miniaturized patterns were then laid out on a special miniature planning board to achieve the most economical lay-out, that is, to assure wastage within given predetermined limits. Next, a picture was taken heretofore of the miniaturized lay-out by means of a 35 mm. camera mounted on brackets or supports rigidly secured to the wall in fixed relationship to the planning board. After a number of pictures corresponding to the number of pictures in the 35 mm. film were taken, the camera was removed from its fixed wall support, had to be unloaded, and the exposed film usually had to be sent out for developing and enlarging to obtain permanent records.

This prior art system entailed numerous disadvantages which impaired its optimum usefulness in many installations for several reasons.

As mentioned above, the prior art system, the 35 mm. photographic camera was supported on a fixed wall bracket or support. After loading the camera, it was normally necessary to climb a ladder in order to mount the camera on the support. When all the pictures of the film were taken, someone again had to climb a ladder to remove the camera, unload the exposed film, reload the camera, climb up the ladder again, and remount the camera on the support. Though the camera itself was remotely controlled, such a system was inconvenient, time-consuming, and also fraught with certain dangers. For example, if the 35 mm. commercially available film contained five pictures, the camera was normally left in place on the wall support until all pictures were taken. Considering that the lay-out or marker making of miniaturized patterns on the planning board may involve four hours' work or more and that after the picture had been taken the marker or lay-out was normally removed to make room for the next lay-out, there was no certainty that the single picture taken for the particular lay-out or marker was satisfactory until the film was actually developed. Hence, if for any one of numerous possible reasons, the pictures of a lay-out or marker was unsatisfactory, this could not be determined with the prior art system until it was too late, that is, until long after the lay-out had normally been removed from the planning board.

Additionally, the prior art system required an inconvenient manual leveling of the camera which was at times difficult, considering the fact that such leveling had to be performed with someone standing on a ladder while the camera was mounted on the wall support.

Since most cutting rooms, utilizing a miniaturized marker making system, are not equipped with dark room and enlarging facilities, it was customary to send out the exposed film for developing and enlarging. This involved considerable delays that oftentimes worked a hardship as many companies work against a relatively small stock.

Since the combination of the cut sizes varies frequently, and since additionally any change in fabric width, style, type of material and size assortment requires a new marker, it became apparent that speed in the availability of the photographic enlargement of the miniaturized marker is paramount for the most efficient use of the equipment.

Furthermore, owing to the labor costs involved, most organizations shy away from setting up developing and enlargement facilities within their own organizations.

The present invention provides the following advantages:

(1) Almost instantaneous availability of an enlargement from the picture taken.

(2) Convenient raising and lowering of the camera with good accessibility and simple leveling of the camera.

(3) Movability of the camera mount to enable use thereof with more than one planning board.

(4) Use of a wide angle lens having a fixed focus setting so as to eliminate need for adjustment regardless of size of planning board photographed.

(5) Ability to take the largest possible picture for a planning board of any given length.

(6) Simple and speedy day-light enlargement of negative.

(7) Elimination of need for skilled personnel to produce highly satisfactory enlargements of the miniaturized lay-outs.

Accordingly, it is an object of the present invention to provide a system for obtaining, by photographic means, enlargements of miniaturized lay-outs which eliminates the shortcomings and disadvantages encountered with the prior art systems.

It is another object of the present invention to provide a photographic system for photographing miniaturized lay-outs which assures an almost instantaneous availability of the enlargement, thereby eliminating the danger of repeated lay-outs of the same marker in case of defect in the photographic picture.

Still a further object of the present invention resides in the provision of a camera mount and daylight enlarger unit which are simple in construction, easy to operate even by a person without special skills, and easy to service and maintain.

Another object of the present invention resides in the provision of a photographic system for photographing the lay-out of miniaturized patterns which permits a simple raising and lowering of the camera, yet obviates the need for complicated adjustments in the taking as well as in the developing and enlarging of the photographs.

Still a further object of the present invention resides in the provision of a photographic apparatus having extremely simple controls for the taking of the pictures and the enlargement from negatives.

These and other objects, features and advantages of the present invention will become more obvious from the following description when taken in connection with the accompanying drawing which shows, for purposes of illustration only, one embodiment in accordance therewith, and wherein FIGURE 1 is a perspective view of the movable camera mount in accordance with the present invention;

FIGURE 4 is a top plan view of the camera unit supported by the camera of FIGURE 1;

FIGURE 5 is a top plan view on the alignment gauge shown in FIGURE 3;

FIGURE 6 is a side elevational view of the alignment gauge of FIGURE 5;

FIGURE 7 is a front elevational view of the daylight enlarger unit in accordance with the present invention;

FIGURE 8 is a perspective view of the lower part of the daylight enlarger unit in accordance with the present invention with the front cover removed;

FIGURE 9 is a cross sectional view taken along line 9—9 of FIGURE 8 and showing a cross section through the paper cutter;

FIGURE 10 is a cross sectional view taken along line 10—10 of FIGURE 8 and illustrating the paper control track;

FIGURE 11 is a somewhat schematic elevational view of the motor driven lense actuator unit, and FIGURE 12 is a detail view of the control cam used with the lense actuator unit of FIGURE 11.

Figure 2:
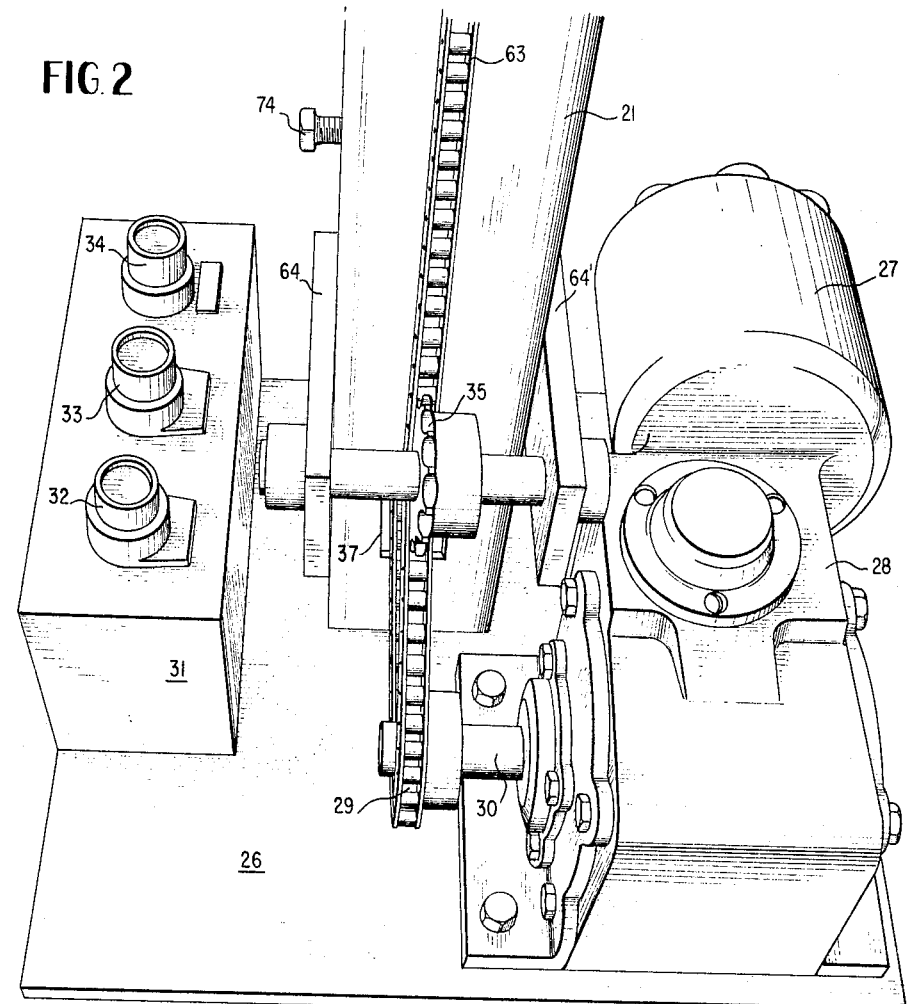
FIGURE 2 is a perspective view on an enlarged scale, looking down on the drive and control unit for the movable camera mount of FIGURE 1.

Referring now to the drawing wherein like reference numerals are used throughout the various views to designate like parts, and more particularly to FIGURE 1, reference numeral 20 generally designates therein the portable camera mount. The latter includes an upright channel member 21 of approximately square cross section which is suitably mounted, for example, by means of bolts, to a base plate 22 which itself is supported by three casters 23 secured to caster arms 24. The arms 24 which subtend approximately equal angles are secured, for example, by means of bolts to the base plate 22. A conventional door stop (not shown) is also mounted on the base plate 22 which, upon being operated in the usual manner by the foot of the operator, prevents movement of the camera mount 20 due to the fractional engagement with the floor.

The channel member 21 is hollow and closed off at the top thereof by means of a cover 25. A control table 26, for example, consisting of a heavy gauge steel plate, is suitably secured, for example, by brackets and bolts (not shown) to the channel member 21 at a convenient height for easy actuation of the control buttons by the operator when standing next to the camera mount. A motor 27 (FIGURES 1, 2 and 3) drives, by way of a suitable gear box 28 of conventional construction, the drive pinion or sprocket gear 29 suitably mounted on the output shaft 30 of the gear box. The motor 27 is a conventional 110 volt alternating current motor adapted to rotate in either direction of rotation, depending on the energization thereof. The motor 27 and gear box 28 may form a unitary assembly suitably mounted on the control table 26. A control box 31 provided with three push bottoms 32, 33 and 34 to be described more fully hereinafter and containing electric switches and circuitry is also suitably mounted on the control table 26.

The bracket structure generally designated by reference numeral 40, which supports the camera, is carried by a collar 41 of such internal configuration as to be complementary to the external configuration of the channel member 21 and thus longitudinally slidable in relation thereto. The bracket structure 40 consists of two horizontal arms 42 and 42′ supported at the collar 41 by means of a pin or stud 43 engaging in the bearing portion 44 suitably secured to or formed integral with the channel member 41. Two obliquely extending support arms 45 and 45′ are each connected at the upper end thereof in any suitable manner to the respective horizontal arms 42 and 42′ and are supported at the lower ends thereof by means of a support pin or stud 46 extending through the bearing portion 47, again suitably secured to the collar 41. A rectangular frame 48 is suitably supported by means of pivot pins 49 and 49′ so as to be pivotal about an axis extending transversely to the arms 42 and 42′. The camera 50 which includes a "Graphlex" back is supported on the frame 48 by means of pivot pins 52 and 52′ in such a manner as to be pivotal about a substantially longitudinal axis, that is, an axis extending at right angle to the transverse pivot axis defined by pivot pins 49 and 49′. Thus, the pivotal supports 49, 49′ and 52, 52′ in effect form a universal joint to permit levelling of the camera. For that purpose, the back of the camera is provided with a bull's eye level 53 of conventional construction.

Reference numeral 54 designates a conventional film holder, for example, a "Polaroid-500" film holder utilizing a "Polaroid 55 P/N" film. A lense 55 which is a wide angle lense, for example a Schneider Kreuznach Super Angular 1:8/65, was found satisfactory with a fixed focal setting if adjusted for an object at a distance of 50 inches regardless of the position of the camera with respect to the planning board. A remotely controlled electrically operated tripping mechanism only schematically shown in FIGURES 1 and 4 is designated in these figures by reference numeral 56. This unit, upon actuation of the push button 34, trips the shutter of the camera in a manner to be described more fully hereinafter.

The collar 41 is suspended by means of a steel cable 60 passing over a pulley 61 and is secured in any suitable manner to the top of the counter-weight 62 of a shape substantially complementary to the internal cross section of the channel member 21 to enable up and down sliding movement thereof within the channel member. The chain 63 which is driven by the drive pinion or sprocket gear 29 passes over a freely rotatable guide pinion or sprocket gear 35, suitably journalled within bearings (not shown) which are supported by brackets or support plates 64 and 64′ suitably fastened to the channel member 21.

After passing around the guide pinion or sprocket gear 35, the chain 63 then extends vertically on the outside of the channel member up to the collar 41 where it is suitably fastened near the lower end of the collar.

The lower portion of the chain 63 passes over another guide pinion or spur gear 36 supported within suitable bearings (not shown) carried either by the plates 64 and 64′ or the channel walls of channel member 21. The channel member 21 is provided with an aperture 37 in its part adjacent to the top of the table 26 for the passage of chain 63 to the inside thereof. After passing through the aperture 37 and around the guide pinion or sprocket gear 36, the chain 63 extends substantially vertically on the inside of channel member 21 and is secured by any suitable means to the lower end of the counter weight 62.

Figure 3:
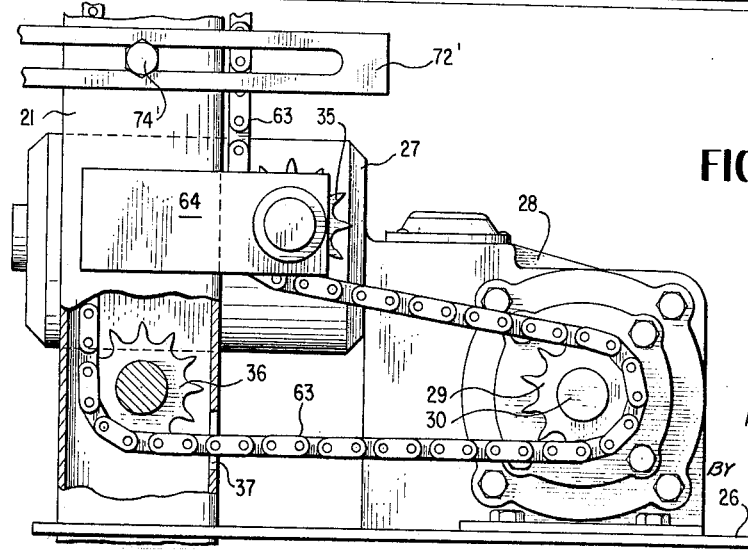
FIGURE 3 is a side elevational view of the drive and control unit of FIGURE 2 with parts thereof broken away for clarity's sake and also showing the alignment gauge in the installed condition thereof.

In operation, when push button 32 is depressed, a conventional switch is closed energizing the motor so as to drive the pinion in a counterclockwise direction as viewed in FIGURE 3. As a result, the bracket assembly 40 is raised, as long as the spring loaded push button 32 is depressed. Upon release, the motor 27 stops and due to the counter-weight and/or the self-locking action of the gear unit 28, for example, by means of a worm gear or the like, the bracket assembly 40 is securely held in the desired position. Actuation of the spring-loaded push button 33 causes lowering of the bracket assembly 40 as long as the push button 33 is depressed. Since the switches actuated by push buttons 32 and 33 are wired in the energizing circuit for the motor 27 in a manner well known to a person skilled in the art, a detailed showing and description thereof is dispensed with herein.

The spring-loaded push button 34, when depressed, starts an electric motor within the tripping unit so as to trip the shutter of the camera. The arrangement is thereby made in such a manner that a one shot control is realized by depressing button 34 as will be explained more fully hereinafter by reference to FIGURES 11 and 12.

In order to properly align the camera with the planning board, that is, to assure parallelism of the camera to the table constituting the planning board, an alignment gauge generally designated by reference numeral 70 is provided. The alignment gauge 70 comprises a plate portion 71 in the form of a truncated cone which is carried by two arms 72 and 72′ suitably secured to the plate 71. Each arm portion is provided with elongated apertures 73 for receiving therein the adjusting screws 74 and 74' adapted to tighten the gauge 70 in a predetermined position. An alignment plate 75 extends downwardly from and transversely of the plate 71. To assure a right angle relationship between the arms 72, 72' and the channel member 21, additional guide means, for example, in the form of bolts 76 or the like, may be provided on the channel member 21 rearwardly of the adjusting screws 74 and 74'. The screws and guide means 74 and 76 are so accommodated on the channel member 21 that the bottom surface of the plate 71 and the front of the plate portion 75 normally engage the top and side of the planning board. The plate 71 is provided with a marker 79 which indicates the center of the camera so that the movable camera mount can be readily aligned approximately with the center of the length of the planning board in question. Obviously, as the camera mount 20 is rolled toward the work table, the desired parallelism between the camera and the planning board exists as soon as the plate portion 75 is in flush engagement with the side of the planning board. The adjustability by means of the elongated apertures 73 is necessary so as to adjust the spacing of the camera from the planning board depending on the used width of a particular lay-out.

Since it is desirable to obtain with the wide angle lense the largest possible picture of the planning board area containing the lay-out and since the length of the boards vary from 6 to 20 feet, the channel member 21 is provided with indicia 78 indicating the desired adjustment of the lower edge of the collar 41 for a given length of planning board. The desired position of the camera can thus be readily achieved by depressing the push buttons 32 or 33.

The shutter tripping unit generally designated by reference numeral 56 includes an electric driving motor 80 driving a cam 81 carried by the output shaft thereof. The switch assembly 82 is provided with a cam follower 83 suitably spring-loaded so as to follow the external contour of the cam 81. The switch 82 is connected in a holding circuit (not shown) disposed in parallel with the switch actuated by push button 34 and connected into the energizing circuit of the motor 80 and is so constructed and arranged in any conventional manner that the holding switch in the parallel motor energizing circuit is closed as soon as the cam starts to rotate and the cam follower 83, after a small angular displacement of the cam 81, is displaced out of the recess 81' and follows the external contour of the cam. A linkage 84 is suitably connected at a predetermined radial distance from the axis of rotation of the cam 81 and in the manner of a crank, trips the shutter upon rotation of the cam. The shutter may be re-cocked, for example, by a suitable tension spring.

In operation, as soon as the push-button 34 is depressed, the motor 80 starts to rotate the cam 81, thereby closing the switch 82 by means of the cam follower 83 until the cam follower is again permitted to enter the recessed portion 81', 81 of the cam after substantially a complete rotation in the course of which, the shutter of the camera is tripped.

By utilizing a "Polaroid-55 P/N" film, the camera produces instantaneously a 4 x 5 negative and positive of the lay-out. Though such instantaneous picture is larger than the 35 mm. negative available heretofore, it is still insufficient for subsequent use as a permanent marker, and therefore requires an enlargement from the negative. For that purpose, the negative is passed through a sodium sulfite bath, a photo flow solution bath, and a water bath as is conventional. These baths may be constituted by small tanks into which the negative is dipped in the usual manner and which may be placed alongside the daylight enlarger to be described more fully hereinafter.

The arrangement of the camera mount and remote tripping unit are simple in construction, yet extremely reliable in operation.

If so desired, to take up the slack of the electric cable energizing the driving motor 80 of the tripping unit, a conventional automatic cord reel 65 may be interposed between the switch actuated by the push button 34 and the driving motor 80.

Of course, the negative of the exposed film could be sent out for the enlargement necessary with a 16 yard planning board. However, aside from the cost, this involves delays of several days which are unacceptable in present day production schedules.

For that reason, the photographic system of the present invention also provides a daylight enlarger unit generally designated in FIGURES 7 and 8 by reference numeral 100 which obviates the need for a dark room. The unit 100 is composed of a housing generally designated by reference numeral 101 and of an enlarger assembly 150 which is of a commercially available type and comprises a conventional light source housing part 151 and an enlarger part 152 provided with the conventional bellows and containing the optical system. A space 153 is provided between the housing part 151 and the enlarger part 152 for receiving therein the negative holder 154 of conventional construction. The enlarger assembly 150 is suitably mounted on the upper housing portion 102 of approximately truncated conical shape which in turn is adjoined by the elongated lower housing portion 103 containing the controls for the enlargement paper advance. The lower housing portion 103 rest on a support table 104 and is covered by a removable cover 105 behind which lie the controls for advancing, guiding, cutting and feeding the enlarging paper to the developer as will be described more fully hereinafter.

A conventional timer unit 106 of a commercially available type is mounted on the housing portion 103 and is operatively connected in the usual manner by a cable with the light source contained within the housing part 151 to selectively control the on-time of the light source.

The commercially available supply of enlarging paper in the form of casing 107 is mounted in the left corner of the lower housing portion 103 on the base 160 of suitable material. An actuating rod 108 adapted to be manually rotated by means of knob 109 is rotatably supported by means of suitable bearings within supporting members or brackets 141 and 141' suitably secured to the lower housing base 160 and carries at the opposite end a gear 110. The gear 110 meshes with a much smaller gear 111 carried by the pressure roller 112 of a pair of pressure rollers 112, 113 having suitable friction surfaces and rotatably supported in bearings within supporting members 141 and 141'. The pressure roller 113 is spring-loaded in a conventional manner so as to normally urge the opposite friction surfaces of the rollers 112 and 113 into engagement with one another, for example, by springs abutting against the lower part of the bearing supporting roller 113 and pre-stressed by adjusting screws engaging the opposite end of the springs. Accordingly, upon turning the knob 109 in the clockwise direction as viewed in FIGURES 7 and 8, the enlarging paper from casing 107, previously inserted between rollers 112 and 113, is advanced by means of feed pressure rollers 112 and 113 from left to right below the paper cutter assembly generally designated by reference numeral 114 onto the paper control track generally designated by reference numeral 115 and mounted on base 160 which may be of wood. The paper control track 115 includes a base member 116 having a very smooth exposed upper surface and may be made for that purpose of formica. The longitudinal edge portion of base member 116 is slightly undercut (FIG. 10) to receive the metal paper guide strips 118 extending along both sides of base member 116. Inverted L-shaped guide channel members 119 are secured to the sides of base member 116 and form an accurately determined gap 120 between a downwardly extending portion 119' and the corresponding strip 118 through which extend the edge portions of the enlarging paper. To assist the guidance of the enlarging paper onto the track 115 as it emerges underneath the cutter assembly, the left end of the longitudinally extending channel members 119 are cut off to provide slanting surfaces inclined downwardly toward the right.

The knob 117 actuates the roller 121 of a pair of pressure rollers 121, 122 constructed in a manner similar to pressure rollers 112 and 113 for feeding the enlarging paper after exposure to the developing unit 123 after being cut by means cutter 114.

Suitable paper guides 132, 133 and 134 are provided at the tracking end of the paper track 115, to the right of pressure rollers 121, 122 and at the inlet to the developing unit 123 to guide the enlarging paper into the pressure rollers 121 and 122 and upon leaving the latter into the developing unit 123. The developing unit 123 is a commercially available unit utilizing a developer solution and a stabilizer solution for the enlarging papers as it passes through two baths, guided and advanced by means of motor driven rollers as is conventional and well known.

The paper cutter assembly 114 consists of a channel member 125 secured to base member 160 within which is guided the guide portion 126 of the knife support 127 supporting thereon a spring-loaded knife 128 secured to the knife support by bolt 129. The knob 130 is connected with the knife support 127 by rod 131 so that, when pulling out the knob 131, the knife edge is moved transversely across the enlarging paper and cuts the same. A spring mounted over rod 131 may be interposed between the support member and the knife support 127 to prevent damage to the knife 128 when pulling the knob 131.

In operation, the knob 131 is normally in the fully inserted position and enlarging paper is fed by rotation of knob 109 until knob 117 begins to rotate thereby indicating the arrival of the enlarging paper at a point beyond the right hand end of track 115, the enlargement corresponding in size approximately to the latter. The timer 106 is thereafter energized, and as soon as the timer has run down, the paper cutter knob 131 can be pulled out to cut the paper and thereupon the developer feed knob 117 is rotated counterclockwise until it begins to rotate automatically indicating that the enlarging paper has been seized by the motor driven feed rollers of the developing unit 123. The fully developed enlargement then leaves the developing unit by way of guides 133 and 134.

Since the developing unit is a commercially available type, well known per se, a detailed description thereof is dispensed with herein.

Of course, the developer unit 150 is equipped with the usual controls such as adjusting knob 155 for adjusting the size of the enlargement, etc.

By utilizing the daylight enlarger described herein, instant inexpensive enlargements, as well as an unlimited number of copies, are available, utilizing trouble-free daylight film developing and printing. The enlargements are available within about sixty seconds, obviating the dark room and expenses as well as delays connected with outside developing.

Moreover, the daylight enlarger is also compact and maintenance free, thereby providing a simple photographic enlarger unit that may be operated by any person.

The foregoing clearly demonstrates that the camera mount and daylight enlarger in accordance with the present invention provide a simple photographic means for instant enlargement of markers from miniaturized layouts. Furthermore, any number of copies of the enlarged markers are readily available for the cutting room thereby expediting production schedules.

Moreover, standard commercially available components are used in large measure with the camera mount and enlarging unit of the present invention, thereby, additionally reducing the cost of the equipment by obviating the need of specially designed components.

While I have shown and described one embodiment in accordance with the present invention, it is understood that the same is not limited thereto, but is susceptible of numerous changes and modifications as known to a person skilled in the art, and I therefore do not wish to be limited to the details shown and described herein, but intend to cover all such changes and modifications as are encompassed by the scope of the appended claims.

I claim:

1. For use with a miniaturized marker system, a photographic equipment enabling rapid reproduction of enlargements of the lay-out on the planning board and utilizing a camera having a wide angle lense and a shutter, and operable to reproduce a positive and negative within a relatively short time after the taking of the picture, comprising:
   a movable camera mount for said camera including a relatively fixed upright member and a bracket structure guided on and movable relative to said upright member,
   drive means on said camera mount for raising and lowering said bracket structure,
   electrically controlled actuating means for tripping said shutter,
   a control unit secured to said upright member having selectively actuatable means for selectively raising and lowering said bracket structure and for remotely controlling the tripping of said shutter,
   counter-weight means connected to said bracket structure to facilitate raising and lowering thereof,
   and a daylight developer including a housing having a base member, an enlargement head receiving therein the negative and mounted on said housing, manual means within the enlarger housing for feeding enlarging paper over a predetermined length of the base member thereof, said enlarger head including a source of light, timer means for controlling the on-time of the source of light, paper cutting means within said enlarging unit, a developing unit, and manual means selectively for feeding the exposed enlarging paper after cutting thereof into said developing unit.

2. For use with a miniaturized marker system, a photographic equipment enabling rapid reproduction of enlargements of the lay-out on the planning board, and utilizing a camera having a wide angle lense and a shutter, and operable to reproduce a positive and negative within a relatively short time after the taking of the picture, comprising:
   a movable camera mount for said camera including a relatively fixed upright member and a bracket structure guided on and movable relative to said upright member,
   drive means on said camera mount for raising and lowering said bracket structure,
   electrically controlled actuating means for tripping said shutter,
   a control unit secured to said upright member for selectively raising and lowering said bracket structure and for remotely controlling the tripping of said shutter,
   counter-weight means connected to said bracket structure to facilitate raising and lowering thereof,
   said electrically controlled actuating means including a tripping motor and a cam member driven by the motor, circuit means for energizing said tripping motor including a holding circuit, normally open switch means in the holding circuit, means for closing said switch means during a major portion of the rotation of the cam means including a cam follower to provide a one shot actuation of the tripping motor, and link means operatively connecting said cam with the shutter,
   and a daylight developer including a housing having a base member, an enlargement head receiving therein the negative and mounted on said housing, manual means within the enlarger housing for feeding enlarging paper over a predetermined length of the base member thereof, said enlarger head including a source of light, timer means for controlling the on-time of the source of light, paper cutting means within said enlarging unit, a developing unit, and manual means selectively for feeding the exposed enlarging paper after cutting thereof into said developing unit.

3. For use with a miniaturized marker system, a photographic equipment enabling rapid reproduction of enlargements of the lay-out on the planning board, and utilizing a camera having a wide angle lense and a shutter, and operable to reproduce a positive and negative within a relatively short time after the taking of the picture, comprising:

a movable camera mount for said camera including a relatively fixed upright member and a bracket structure guided on and movable relative to said upright member, a drive means on said camera mount, for raising and lowering said bracket structure, electrically controlled actuating means for tripping said shutter, a control unit secured to said upright member having selectively actuatable means for selectively raising and lowering said bracket structure and for remotely controlling the tripping of said shutter, counter-weight means connected to said bracket structure to facilitate raising and lowering thereof, and a daylight developer including a housing having a base member, an enlargement head receiving therein the negative and mounted on said housing, manual means within the enlarger housing for feeding enlarging paper over a predetermined length of the base member thereof, said enlarger head including a source of light, timer means for controlling the on-time of the source of light, paper cutting means within said enlarging unit, a developing unit, and manual means selectively for feeding the exposed enlarging paper after cutting thereof into said developing unit, said base member being provided with guide means, a first pair of pressure rollers actuated by said first manual means and a second pair of pressure rollers actuated by said second manual means, and said paper cutting means including a knife and means for guiding said knife in its cutting movements transversely of the enlarging paper.

4. For use with a miniaturized marker system, a photographic equipment enabling rapid reproduction of enlargement of the lay-out on the planning board, and utilizing a camera having a wide angle lense and a shutter, and operable to reproduce a positive and negative within a relatively short time after the taking of the picture, comprising:

a movable camera mount for said camera including a relatively fixed upright member and a bracket structure guided on and movable relative to said upright member, said bracket structure including means for supporting said camera in such a manner as to enable universal movement of the camera, and means on said camera to enable leveling thereof, drive means on said camera mount for raising and lowering said bracket structure, electrically controlled actuating means for tripping said shutter, a control unit secured to said upright member having selectively actuatable means for selectively raising and lowering said bracket structure and for remotely controlling the tripping of said shutter, counter-weight means disposed within said upright member and connected to said bracket structure to facilitate raising and lowering thereof, said electrically controlled actuating means including a tripping motor and a cam member driven by the motor, circuit means for energizing said tripping motor including a holding circuit normally open, switch means in the holding circuit, means for closing said switch means during a major portion of the rotation of the cam means including a cam follower to provide a one shot actuation of the tripping motor, and link means operatively connecting said cam with the shutter, and a daylight developer including a housing having a base member, an enlargement head receiving therein the negative and mounted on said housing, manual means within the enlarger housing for feeding enlarging paper over a predetermined length of the base member thereof, said enlarger head including a source of light, timer means for controlling the on-time of the source of light, paper cutting means within said enlarging unit, a developing unit, and manual means selectively for feeding the exposed enlarging paper after cutting thereof into said developing unit, said base member being provided with guide means, a first pair of pressure rollers actuated by said first manual means and a second pair of pressure rollers actuated by said second manual means, and said paper cutting means including a knife and means for guiding said knife in its cutting movements transversely of the enlarging paper.

5. For use with a miniaturized marker system, a movable camera mount comprising:

an upright channel member, a collar member of complementary internal configuration to the external configuration of said channel member and adapted to slide over the same, camera support means including laterally extending arms secured to said collar, means for mounting the camera to enable universal movement thereof, a control table secured to said channel member, reversible drive means mounted on said table, and a control unit on said table, a counter-weight slidable within said channel member, means connecting said collar with said counter-weight by way of said drive means, and means connecting said collar with said counter-weight by way of a pulley mounted near the top of said channel member, a tripping unit on said camera support means for tripping the shutter of the camera including a driving motor, an energizing circuit for said driving motor including a switch adapted to be closed upon depressing a push button provided in said control unit, and an alignment gauge including a plate portion provided with a downwardly projecting alignment member and arm portions supporting said plate on said channel member.

6. For use with a miniaturized marker system, a movable camera mount comprising:

an upright channel member, a plurality of caster supports mounted near the bottom of said channel member, caster means secured to each of said caster supports, a collar member of complementary internal configuration to the external configuration of said channel member and adapted to slide over the same, camera support means including laterally extending arms secured to said collar, means for mounting the camera to enable universal movement thereof, a control table secured to said channel member, reversible drive means mounted on said table, and a control unit on said table, a counter-weight slidable within said channel member, means connecting said collar with said counter-weight by way of said drive means, and means connecting said collar with said counter-weight by way of a pulley mounted near the top of said channel member, a tripping unit on said camera support means for tripping the shutter of the camera including a driving motor, an energizing circuit for said driving motor including a switch adapted to be closed upon depressing a push button provided in said control unit, and an alignment guage including a plate portion provide with a downwardly projecting alignment member and arm portions supporting said plate on said channel member.

7. For use with a miniaturized marker system, a movable camera mount comprising:

an upright channel member, a collar member of complementary internal configuration to the external configuration of said channel member and adapted to slide over the same, camera support means including laterally extending arms secured to said collar, means for mounting the camera to enable universal movement thereof, a control table secured to said channel member, reversible drive means mounted on said table, and a control unit on said table, a counter-weight slidable within said channel member, means connecting said collar with said counter-weight by way of said drive means, and means connecting said collar with said counter-weight by way of a pulley mounted near the top of said channel member, a tripping unit on said camera support means for tripping the shutter of the camera including a driving motor driving a cam member, an energizing circuit for said driving motor including a switch adapted to be closed upon depressing a push button provided in said control unit and a holding circuit, switch means for closing said holding circuit, cam follower means for closing said switch means during one rotation of the cam upon energization of the driving motor by depressing said push button, and an alignment guage including a plate portion provided with a downwardly projecting alignment member and arm portions supporting said plate on said channel member.

8. For use with a miniaturized marker system, a movable camera mount comprising:

an upright channel member, a plurality of caster supports mounted near the bottom of said channel member, caster means secured to each of said caster supports, a collar member of complementary internal configuration to the external configuration of said channel member and adapted to slide over the same, camera support means including laterally extending arms secured to said collar, means for mounting the camera to enable universal movement thereof, a control table secured to said channel member, reversible drive means mounted on said table, and a control unit on said table, a counter-weight slidable within said channel member, means connecting said collar with said counter-weight by way of said drive means, and means connecting said collar with said counter-weight by way of a pulley mounted near the top of said channel member, a tripping unit on said camera support means for tripping the shutter of the camera including a driving motor driving a cam member, an energizing circuit for said driving motor including a switch adapted to be closed upon depressing a push button provided in said control unit and a holding circuit, switch means for closing said holding circuit, cam follower means for closing said switch means during one rotation of the cam upon energization of the driving motor by depressing said push button, and an alignment gauge including a plate portion provided with a downwardly projecting alignment member and arm portions supporting said plate on said channel member.

9. For use with a miniaturized marker system, a daylight developing unit, comprising:

a housing having a bottom portion and an upper portion of truncated conical shape, and a removable cover for said bottom portion, a base member forming a paper track within said bottom portion, enlargement head means mounted on said upper portion to receive a negative and project the image of the negative onto said base member, and including a source of light with means to project the light through said negative, a timer unit mounted on said housing for controlling the on-time of the light source of said enlargement head, a developing unit including a driving motor and feed rollers mounted below said housing, a supply of printing paper, means to store said printing paper in said housing bottom portion, and means for feeding a predetermined length of said printing paper over said base member including manually driven pressure rollers including an actuating knob for advancing the printing paper onto the base member, said base member being provided with paper guide means, manually driven means including a further knob for feeding the printing paper from said base member to the developing unit, and paper cutting means including a knife adapted to be displaced transversely of the feed direction of the printing paper for cutting the printing paper before feeding the same to the developing unit, said cutting means including a hollow channel member extending transversely of the paper, a knife support guided within said channel member, a cutting knife secured to said knife support, and a pull rod provided with a knob and fastened to said knife support for horizontally moving the knife edge transversely through the paper, all of said knobs being accessible outside of said cover.

10. The device of claim 9, wherein said enlargement head means includes means to selectively change the enlargement of the image projected onto said base member.

References Cited by the Examiner

UNITED STATES PATENTS

| | | | |
|---|---|---|---|
| 2,751,814 | 6/1956 | Limberger | 88—24 |
| 3,146,661 | 9/1964 | Young | 88—24 |
| 3,167,996 | 2/1965 | Adler | 88—24 |

NORTON ANSHER, *Primary Examiner.*

RICHARD A. WINTERCORN, *Assistant Examiner.*